United States Patent [19]
Welch

[11] Patent Number: 6,109,819
[45] Date of Patent: Aug. 29, 2000

[54] FASTENER CLIP FOR JOINT STRUCTURE

[75] Inventor: Montgomery J. Welch, Spring Lake, Mich.

[73] Assignee: Modular Systems, Inc., Fruitport, Mich.

[21] Appl. No.: 09/181,249

[22] Filed: Oct. 28, 1998

[51] Int. Cl.[7] ................................................ F16B 21/09
[52] U.S. Cl. ...................... 403/353; 403/319; 248/300; 248/222.41
[58] Field of Search .................. 403/409.1, 353, 403/331, 334, 230, 231, 245, 246, 315, 316, 319; 248/300, 224.7, 222.41, 225.11, 221.11

[56] References Cited

U.S. PATENT DOCUMENTS

| | | |
|---|---|---|
| 1,751,463 | 3/1930 | Backus et al. ...................... 248/222.41 |
| 3,451,362 | 6/1969 | Ostling et al. . |
| 3,491,820 | 1/1970 | Ostling . |
| 3,634,983 | 1/1972 | Welch . |
| 3,645,162 | 2/1972 | Welch . |
| 3,741,594 | 6/1973 | Ostling . |
| 3,894,377 | 7/1975 | Welch . |
| 3,996,718 | 12/1976 | Welch . |
| 4,135,837 | 1/1979 | Suttles ..................................... 403/353 |
| 4,178,047 | 12/1979 | Welch . |
| 4,332,205 | 6/1982 | Corl, Jr. . |
| 4,434,900 | 3/1984 | Cook ................... 248/222.41 |
| 4,470,716 | 9/1984 | Welch . |
| 4,473,316 | 9/1984 | Welch . |
| 4,474,493 | 10/1984 | Welch . |
| 4,601,247 | 7/1986 | Welch . |
| 4,878,639 | 11/1989 | Tempco .............................. 248/225.11 |
| 5,024,409 | 6/1991 | Bohnen .............................. 248/222.41 |

*Primary Examiner*—Lynne H. Browne
*Assistant Examiner*—Kenneth Thompson
*Attorney, Agent, or Firm*—Van Dyke, Gardner, Linn & Burkhart, LLP

[57] ABSTRACT

A fastener clip for forming a joint between two furniture panels includes a pair of flanges spaced from a central member by a pair of legs. The central member is defined by a pair of arms having a slot therebetween. Preferably, the slot includes inclined wedging surfaces. One of the arms of the central member is connected to an access member, which opposes the other arm of the central member. The access member permits the securing stud to engage the slot of the central member by being moved laterally into registry with the slot, while the opposing arm of the central member prohibits contact between the securing stud and the furniture panel. An upwardly extending flap positioned in the leg opposing the closed end of the slot prevents contact between the securing stud and the furniture panel when the securing stud is disengaged from the slot.

31 Claims, 5 Drawing Sheets

FASTENER CLIP FOR JOINT STRUCTURE

BACKGROUND OF THE INVENTION

This invention relates generally to fastening systems for furniture, and more particularly, to a fastener clip for forming a joint between furniture panels.

Many joints between furniture parts such as cabinets, shelving and table installations are fastened together by concealed mechanical fastener assemblies. See, for example, U.S. Pat. Nos. 4,332,205 and 4,178,047. Many of these concealed fastener assemblies employ keyhole type slots dimensioned to receive the head of a securing stud.

One prevalent form of fastener assembly requires a recess to be formed along the edge of one of the furniture panels as shown, for example, in U.S. Pat. Nos. 3,451,362; 3,634,983 and 3,645,162. The fastener clip having a stud receiving slot is mounted within this recess while a shoulder screw or securing stud is mounted in the corresponding furniture panel. To enable the head of the stud to engage the fastener, the furniture panel having the recess is also formed with a laterally positioned window communicating with the recess. This window provides access to the recess, and is formed adjacent to the end of the fastener through which the securing stud enters. To join the furniture panels, the securing stud is passed through the window into the recess, and assumes a position proximate to the slot's entrance. The securing stud is then urged along the slot, which may include an inclined ramp, to seat the securing stud and thus firmly join the furniture panels. This fastener assembly is often referred to as a "non-locking" fastener.

Another form of fastener assembly commonly used in the industry is referred to as "semi-locking" fastener as shown in U.S. Pat. No. 3,894,377. These semi-locking fasteners are of generally the same construction as those described above. However, the slot of the semi-locking fastener has converging side edges which form a narrowing width. This narrowing slot is commonly referred to as a "throat." The throat opens out to the seating or closed end of the slot which has an increased width portion. During assembly, the securing stud is urged down the slot and, in so doing, engages the throat to thereby cam the sides of the slot outwardly as it travels toward the seating end. Upon clearing the throat, the sides of the fastener return to their normal position while the stud reaches the seating end of the slot. This semi-locking fastener prevents disassembly absent the application of a sufficient degree of force exerted on the securing stud to cam the throat out of the way.

Still another common fastener assembly is entitled a "locking" fastener as shown in U.S. Pat. Nos. 4,470,716 and 3,491,820. This fastener includes a locking flange extending in an upward direction from the base of the fastener and terminating below the slot, adjacent to the seating end. During assembly, the head of the securing stud engages the slot and depresses the locking flange towards the base of the fastener as it travels towards the seating end of the slot. Once positioned in the seating end, the head of the securing stud has passed beyond the locking flange which has resiliently returned to its original position. In this original position, the end of the locking flange is positioned immediately adjacent the head of the securing stud. Thus, an attempt at removing the head of the securing stud from the seating end of the slot results in contact between the locking flange and the head of the securing stud. This contact prohibits the securing stud from being removed from the slot.

Under normal assembly conditions, it is usually the furniture panel having the fastener clip which is moved relative to the furniture panel fitted with the securing stud. A problem often encountered during assembly is that the furniture panel having the fastener clip will be moved in a first direction to place the head of the securing stud through the window. However, due to the excessive application of force, the head of the securing stud is not only moved within the interior of the recess, but subsequently impacts the opposing wall of the furniture panel. This inadvertent impact with the opposing wall results in damage to the furniture panel. Often, such furniture has a layer of veneer positioned on its surface. Thus, when excessive force is used to place the fastener clip in proximity to the securing stud, the stud contacts the wood imparting a force which subsequently cracks the wood as well as the veneer positioned thereon. Consequently, due to the state of the prior art, operations utilizing the above described fastener assemblies often experience a large quantity of defects which in turn increases manufacturing costs.

Another problem confronted by the prior art when using semi-locking or non-locking fastener assemblies is encountered during disassembly of the furniture panels. During disassembly, a force is imparted upon one of the furniture panels to move the securing stud in a rearward direction and hence disengage the same from the slot. Again, due to the excessive impartation of force, the head of the securing stud is forced from the slot and subsequently contacts an end wall of the recess and thus causes damage to the furniture panel.

Accordingly, a need exists in the furniture industry for a fastener clip which prohibits contact between the securing stud and the furniture panel which mounts the fastener clip during assembly and disassembly and which can be manufactured simply and effectively from a single blank of material in either the non-locking, semi-locking or locking variations.

SUMMARY OF THE INVENTION

Accordingly, the present invention provides a slotted fastener clip which prevents contact between the securing stud and the furniture panel to which the fastener clip is affixed and enables lateral movement of the securing stud into registry with the slot in the fastener clip.

According to an aspect of the invention, the fastener clip includes a base or pair of flanges for securing the fastener clip to the floor of the recess formed in the furniture panel. Spaced from the plane of the flanges is a central member, formed with a pair of arms defining a ramp or slot therebetween. One of the arms of the central member is attached to an access member. The access member is placed in registration with the window of the furniture panel and opposes the other of the pair of arms. The pair of arms and access member are attached to the base by a pair of legs. The access member is dimensioned to enable the securing stud to enter the central member, in front of the entrance to the slot. Thus during assembly, the securing stud passes through the access member, but is prohibited from contact with the furniture panel by the opposing arm of the central member. The securing stud is then moved down the slot to form a joint between the furniture panels.

According to another aspect of the invention, the access member and the arm opposing the access member are joined to one of the flanges by separate legs. Positioned between these legs is an upstanding flap. During assembly, this flap prevents the securing stud from accidentally moving forward of the opposing arm of the central member and then impacting the opposing wall of the recess, thereby preventing damage. During disassembly when the head of the securing stud is urged in a rearward direction away from the closed end of the slot, the upstanding flap serves as a barrier to thereby prohibit the securing stud from contacting the surrounding furniture panel, and thus prevents damage.

According to another aspect of the invention, the arm of the central member opposing the access member is formed having a region of reduced width. This region of reduced width provides a space for the securing stud shaft which permits the head of the securing stud to clear the access member such that the securing stud shaft can move along the slot formed in the central member.

According to another aspect of the invention, the arms of the central member have converging edges forming a progressively narrower slot to define a throat through which the shaft of the securing stud passes. The throat is spaced from the closed end of the slot to define a seating area which is wider than the width of the throat. Thus, once the shaft of the securing stud is received within the seating area, the throat prevents inadvertent movement of the securing stud away from the seating area of the slot.

In an alternative embodiment, the fastener clip is formed with a locking flange extending from the leg opposing the closed end of the slot. The locking flange extends at an upward angle towards the under surface of the central member and terminates in proximity to the closed end the slot. As the head of the securing stud travels towards the closed end of the slot, movement thereof depresses the locking flange until the head of the securing stud moves beyond the end of the locking flange. Upon arriving at the closed end of the slot, the locking flange returns to its original position, and thus prevents the head of the securing stud from moving away from the closed end of the slot.

In a preferred embodiment, the fastener clip of the present invention is made from spring steel or other rigid material which will flex and then snap back to its original position. Thus, in the event the securing stud contacts the arm of the central member opposing the access member, the clip possesses sufficient yield strength to prevent damage to the furniture panel or permanent deformation of the fastener clip. Consequently, damage to the furniture panel is minimized, while the economic life of the fastener clip is increased.

The present invention also provides a method of forming a fastener clip from a single sheet or blank of material. The method includes cutting the sheet of material and bending the same to form a base having a pair of upstanding legs extending therefrom and a raised central member having a slot, and an access member. The bending also provides for the formation of a flap on the upstanding leg opposing the closed end of the slot.

The present invention provides a fastener clip which can be manufactured in either the non-locking, semi-locking or locking variation and effectively prohibits potentially damaging contact between the furniture panel to which the clip is secured and the securing stud. Additionally, in the non-locking and semi locking variations, the upstanding flap provides a barrier to prevent contact between the furniture panel and the securing stud during assembly and disassembly. The fastener clip of the present invention can be made from a single sheet or blank of material, preferably spring steel, or fashioned from other material with spring steel like qualities, to thereby produce a fastener clip having sufficient yield strength while reducing production costs.

These and other objects, advantages, purposes and features of the invention will become apparent upon review of the following specification in conjunction with the drawings.

DESCRIPTION OF THE PREFERRED EMBODIMENTS

Figure 1:
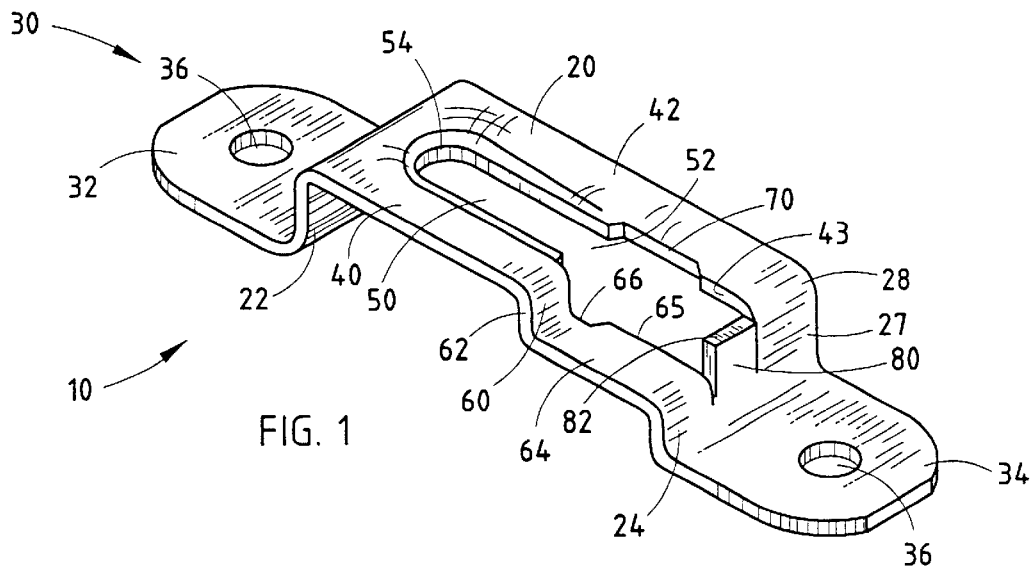
FIG. 1 is a perspective view of a first embodiment of a fastener clip according to the invention.
Figure 2:
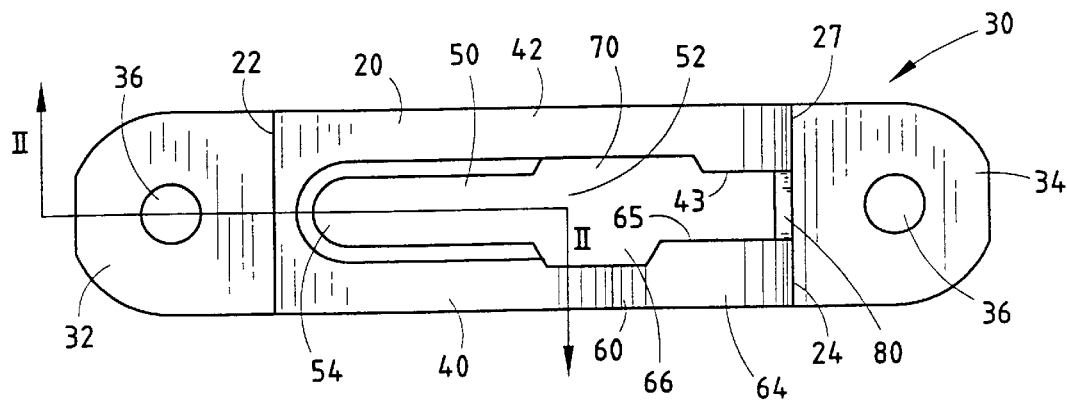
FIG. 2 is a plan view of the fastener clip depicted in FIG. 1.
Figure 3:
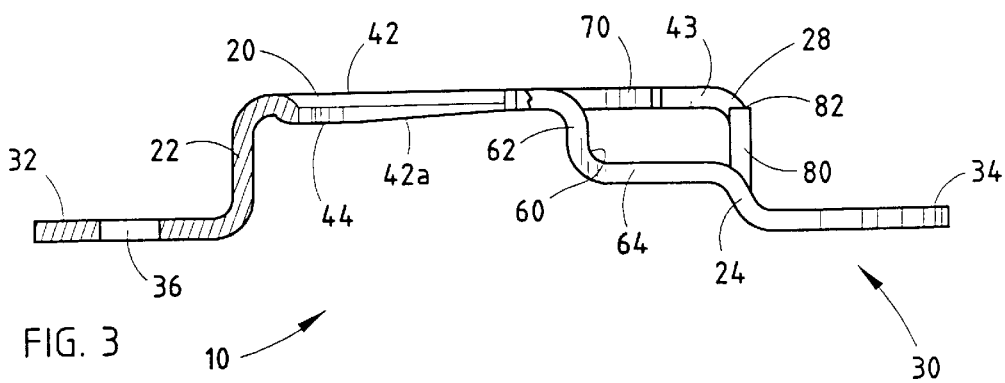
FIG. 3 is a partial cross sectional side view of the fastener clip depicted in FIGS. 1 and 2 taken along line II—II of FIG. 2.
Figure 4:
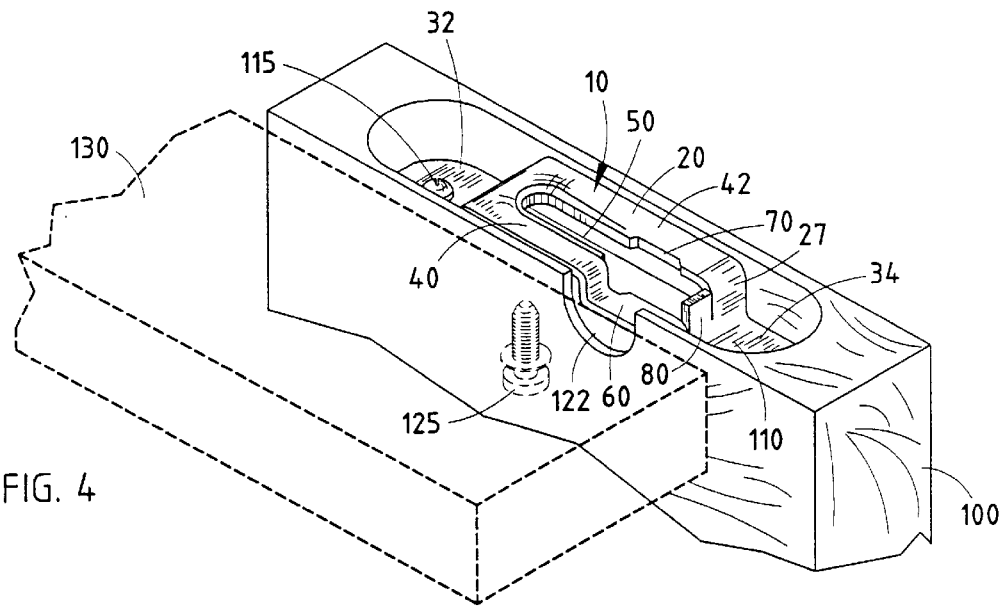
FIG. 4 is a perspective view of the fastener clip of FIGS. 1–3 secured within the recess of a furniture panel with a second furniture panel having a securing stud attached thereto depicted in phantom.
Figure 5:
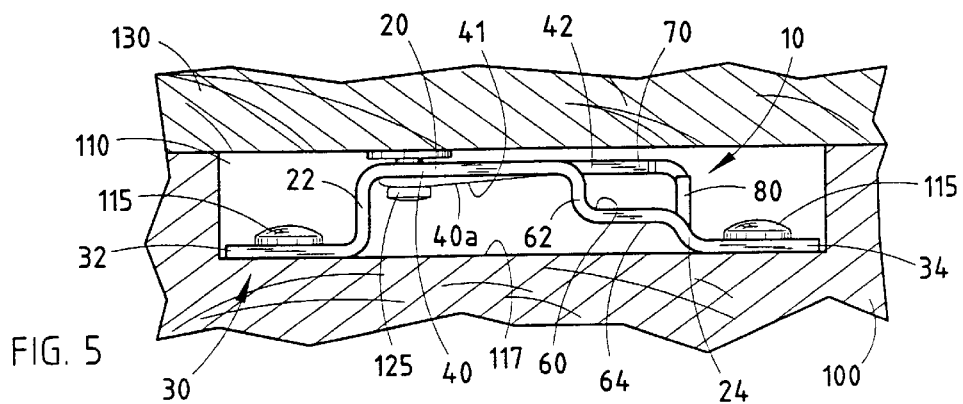
FIG. 5 is a cross sectional view of a joint illustrating two furniture panels joined together by the fastener clip depicted in FIGS. 1 through 4.
Figure 12:
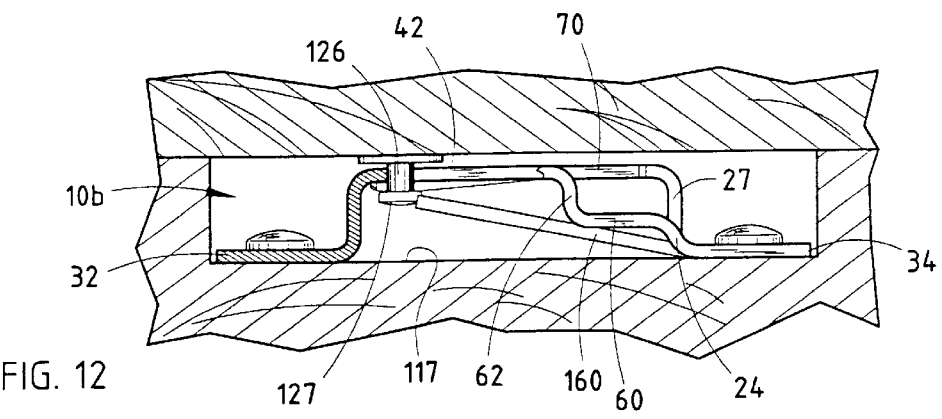
FIG. 12 is a partial cross sectional view of a joint illustrating two structural members joined together by the fastener clip depicted in FIGS. 8 through 11.

Referring now specifically to FIGS. 1 through 5, there is shown a fastener clip 10, according to the present invention, for use in forming a joint between two furniture panels. Fastener clip 10 comprises a top or central member 20 defined by a pair of generally parallel arms 40 and 42, an L-shaped entrance or access member 60 and a base 30. Arm 42 is connected to base 30 by a pair of upstanding legs 22 and 27. Arm 40 extends from upstanding leg 22 and is attached to access member 60. Access member 60 is connected to base 30 by an upstanding leg 24. Preferably, base 30 includes a pair of flanges 32 and 34. Preferably, flanges 32 and 34 project from legs 22, 24 and 27 in opposite directions and away from central member 20. Alternatively, flange 34 may project toward flange 32 as disclosed in U.S. Pat. No. 4,473,316 the disclosure of which is hereby incorporated by reference herein. A throughhole 36 is formed in each flange 32, 34. Throughholes 36 are dimensioned to receive a securing screw 115, or other commonly employed fastener, to thereby permit securement of fastener clip 10 within a recess 110 formed in a first furniture panel 100 (FIGS. 4 and 5).

Arms 40 and 42 together form a slot 50 therebetween. Slot 50 is formed with an entrance end 52 and a closed or seating end 54 proximate to leg 22. As illustrated in FIG. 3, the edges of arms 40, 42 which define slot 50 provide wedging surfaces 40a, 42a which slope in a slightly downward direction from entrance 52 seating end 54. Lower surface 44 of central member 20 at seating end 54 is thus spaced or recessed downwardly with respect to the top surface of central member 20. When fastener clip 10 is attached to first furniture panel 100 and a securing stud 125, attached to a second furniture panel 130, is moved toward seating end 54 of slot 50, the downwardly sloping wedging surfaces 40a, 42a of arms 40, 42 are urged towards the second furniture panel 130 to thereby draw first furniture panel 100 and second furniture panel 130 into tight, abutting contact.

Access member 60 is attached to arm 40 and leg 24. Access member 60 permits the introduction of securing stud 125 to central member 20 such that securing stud 125 may be placed in registration with slot 50 from a lateral direction perpendicular to the longitudinal extent of the slot 50 and be moved towards seating end 54 to thereby form a joint between first furniture panel 100 and second furniture panel 130. Access member 60 is of a generally L-shaped configuration and includes a generally vertical first member 62 depending from arm 40 generally at a right angle to arm 40. First member 62 is connected to a generally horizontal second member 64 which is generally parallel to arms 40, 42 and is attached at its distal end generally at a right angle to leg 24. Preferably, second member 64 resides in a plane between the plane formed by central member 20 and the plane defined by flanges 32 and 34 and extends at a right angle to first member 62.

A cut out section 70 is formed along inner edge surface 43 of arm 42. Cut out section 70 opposes access member 60 and is positioned between leg 27 and entrance 52 of slot 50. Cut out section 70 receives the shaft 126 of securing stud 125 to provide clearance for head 127 of stud 125 past access member 60 when securing stud 125 travels toward seating end 54. As head 127 travels past access member 60, the end of cut out section 70 is reached and securing stud 125 is directed back to the centerline of slot 50. To provide commensurate strength between arm 42 and access member 60 and arm 40, access member 60 is thinned at cut-out section 66 proportionately to arm 42 at cut-out section 70. Preferably, equal strength between access member 60, arm 40 and arm 42 is achieved by forming first member 62 with a width less than the width of second member 64, and cut-out section 66 along inner surface 65 of second member 64.

In a preferred embodiment, arms 40, 42 have a width of approximately 0.165 inches with arm 40 having a length of approximately 0.49 inches and arm 42 having a length of approximately 1.25 inches. When arms 40, 42 are so dimensioned, cut out section 70 will preferably have a length of approximately 0.411 inches with a width of approximately 0.04 inches. Also, in the preferred embodiment, second member 64 of access member 60 has a width of approximately 0.165 and a length of approximately 0.38 inches while the width of cut out section 66 is approximately 0.04 inches. Additionally, in the preferred embodiment, first member 62 of access member 60 will have a width of approximately 0.125 inches.

A generally vertical flap 80 is formed between legs 24 and 27. Preferably, top 82 of flap 80 terminates in a plane below the plane defined by top 28 of leg 27. During assembly and disassembly of the joint formed between first furniture panel 100 and second furniture panel 130, flap 80 provides a barrier to prohibit damaging contact between securing stud 125 and first furniture panel 100, as securing stud 125 is captured between flap 80, arm 42 at 70, slot 50, and window 122.

As is best seen in FIGS. 4 and 5, to provide a joint between first furniture panel 100 and second furniture panel 130, fastener clip 10 is secured within recess 110 of first furniture panel 100 by driving screws 115 through throughholes 36 and into floor 117. When so secured, access member 60 will be positioned adjacent to a cut section or window 122 formed in first furniture panel 100. Securing stud 125 is then moved laterally through window 122, and passes beyond access member 60 such that shaft 126 contacts cutout section 70 of arm 42. It is important to recognize that the placement of access member 60 between arm 40 and leg 24 enables arm 42 to act as a barrier and flap 80 provides a block toward flange 34, thereby preventing securing stud 125 from contacting first furniture panel 100 and causing damage thereto. Securing stud 125 is then inserted within slot 50 such that shaft 126 passes through entrance 52 of slot 50 while head 127 contacts undersurfaces 41, 44 of arms 40 and 42. First furniture member 100 is subsequently moved to urge securing stud 125 along the length of slot 50 towards seating end 54, and hence draw first furniture panel 100 toward second furniture panel 130 via wedging surfaces 40a, 42a until shaft 126 reaches seating end 54 of slot 50 and head 127 engages undersurfaces 41 and 44 adjacent seating end 54 to form a secure joint therebetween.

Disassembly is achieved by moving securing stud 125 toward entrance 52 of slot 50 and subsequently in an orthogonal direction through access member 60 and beyond window 122. If an excessive amount of force is applied during disassembly, securing stud 125 will contact flap 80, and thus, securing stud 125 is prohibited from potential damaging contact with first furniture member 100.

Figure 6:
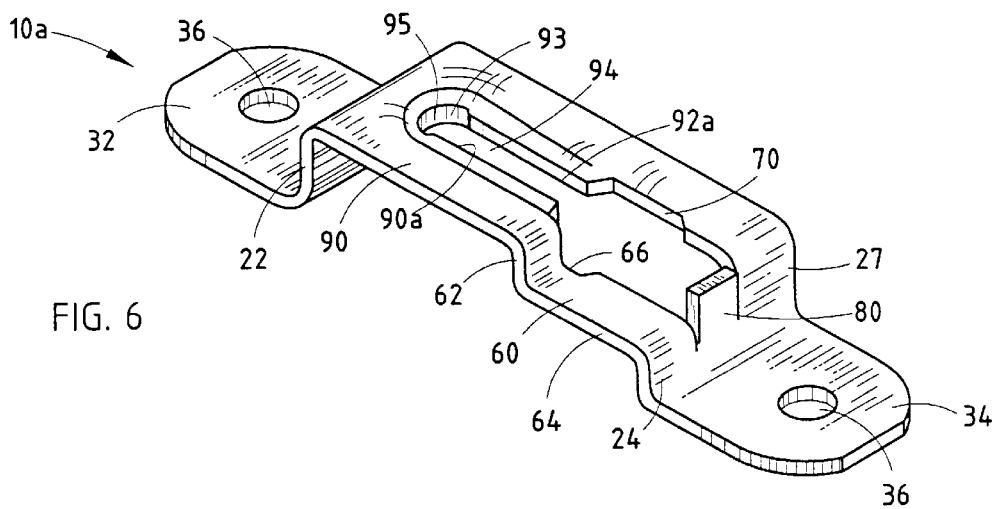
FIG. 6 is a perspective view of a fastener clip according to an alternative embodiment of the invention.
Figure 7:
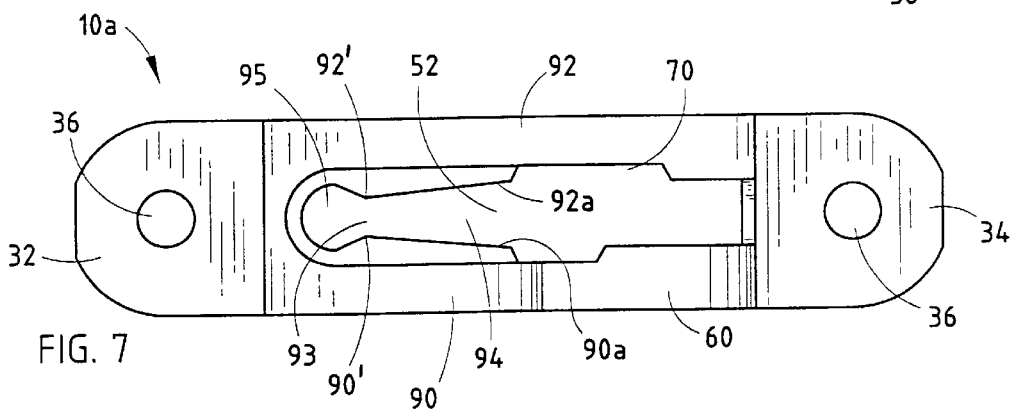
FIG. 7 is a plan view of the fastener clip depicted in FIG. 6.
Figure 8:
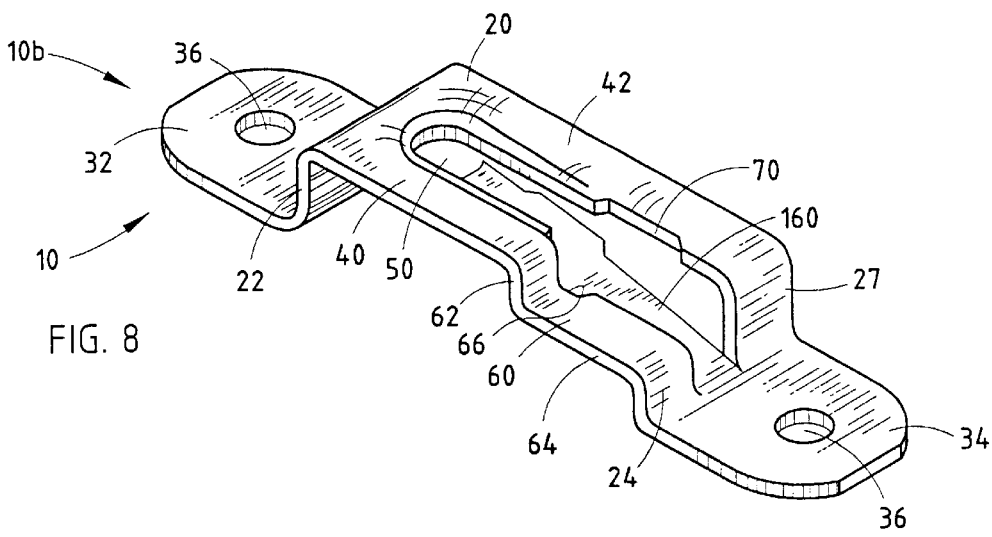
FIG. 8 is a perspective view of a fastener clip according to another alternative embodiment of the invention.
Figure 9:
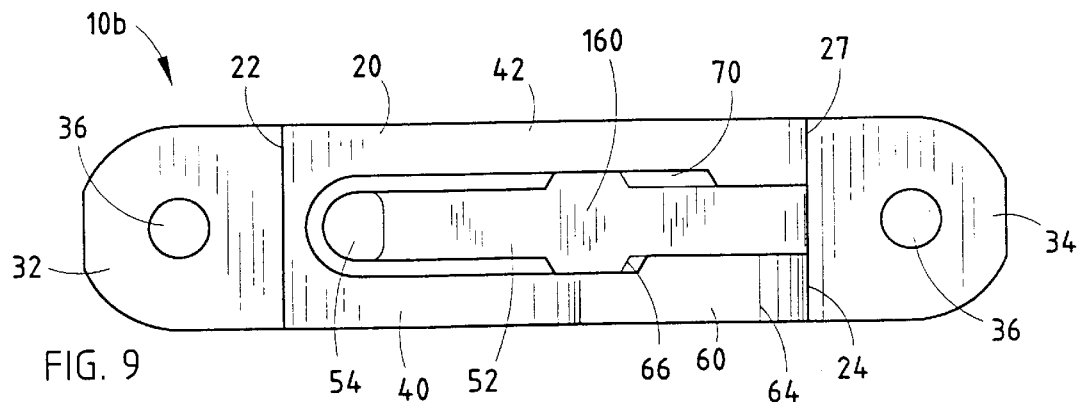
FIG. 9 is a plan view of the fastener clip depicted in FIG. 8.
Figure 10:
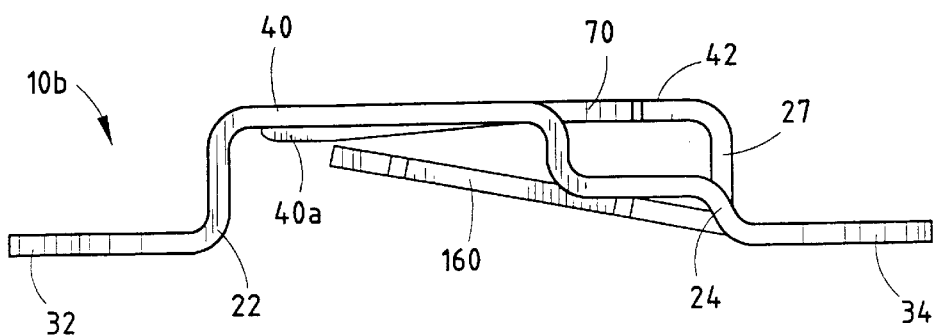
FIG. 10 is a side elevation of the fastener clip depicted in FIGS. 8 and 9.

Referring now to FIGS. 6 and 7, there is shown an alternative fastener clip 10a. Fastener clip 10a is identical in many respects to fastener clip 10 described above and thus, like reference numerals will be utilized to describe like components.

In fastener clip 10a, central member 20 is formed with a pair of wedging arms 90 and 92. Arms 90 and 92 have converging inner edges 90a, 92a which form a tapered slot 94 therebetween leading to a narrowed throat 93. Edges 90a, 92a of wedging arms 90 and 92 taper inwardly toward each other reducing the width of slot 94 from its open end to a locus of minimum width, i.e. throat 93, at which point are formed shoulders 90' and 92'. Beyond shoulders 90' and 92' the width of slot 94 widens to form an enlarged seating area 95.

During assembly, wedging arms 90 and 92 are cammed or urged apart by shaft 126 of securing stud 125. Because clip 10a is preferably formed from spring steel or a similar material having sufficient yield strength, when shaft 126 clears throat 93 and shoulders 90' and 92', wedging arms 90 and 92 return to their normal position, while securing stud 125 is confined within seating area 95 by throat 93. Once seated, wedging arms 90, 92 prevent removal of securing stud 125 from slot 94 unless sufficient force is applied to cam apart wedging arms 90 and 92 by forcing shaft 126 of securing stud 125 through throat 93.

Figure 11:
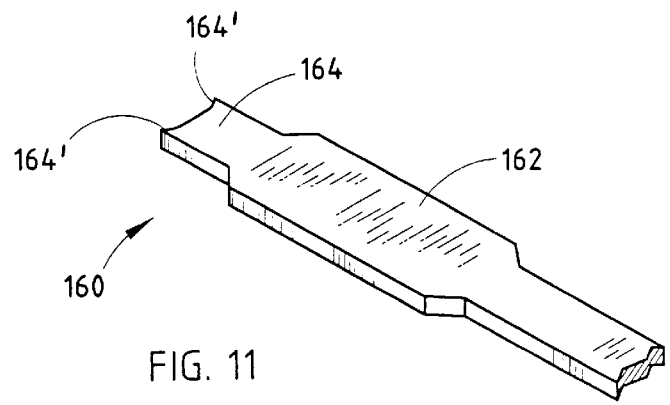
FIG. 11 is a detailed view of the locking flange of the fastener clip depicted in FIGS. 8 through 10.

Referring now to FIGS. 8 through 12, there is illustrated another alternative fastener clip 10b. In this embodiment, a locking flange 160 is formed between legs 24 and 27. Clip 10b does not, however, include a barrier or contact flap between legs 24, 27 as in clips 10 and 10a. Locking flange 160 extends generally rectilinearly in upward direction toward central member 20 and terminates a preselected distance below central member 20, adjacent seating end 54. As depicted in FIG. 11, locking flange 160 is preferably formed within a middle region 162 having an increased width due to cutouts 70 and 66, while end 164 is formed with small appendages 164' at each side. Appendages 164' prevent side to side slippage of the end 164 against stud head 127. The remainder of clip 10b is substantially similar to either clip 10 or 10a.

During assembly, as head 127 of securing stud 125 is moved through slot 50, its movement urges locking flange 160 in a downward direction toward flanges 32 and 34 by sliding contact between head 127 and the top surface of flange 160. Locking flange 160 remains depressed until securing stud 125 clears slot 165 formed in end 164 and arrives at seating end 54. Thereafter, locking flange 160 resiliently returns to its original position and provides a lock to thereby prevent removal of securing stud 125 from slot 50. It will be recognized by those with ordinary skill in the art that in this embodiment, locking flange 160 eliminates a need for flap 80, but is otherwise structurally and functionally identical to fastener clip 10. Alternatively, a tapered slot 50 with a throat 93 as used in clip 10a may be included in clip 10b to provide additional resistance to the removal of securing stud 125.

Fastener clips 10, 10a and 10b can be made from any material possessing the requisite yield strength necessary for the particular application. Such materials include but are not limited to, polymeric compositions, metals, metal alloys or composites. Preferably, fastener clips 10, 10a and 10b are manufactured from spring steel. Also, preferably, fastener clips 10, 10a and 10b have a thickness of approximately 0.050 inches. The use of spring steel provides the particular fastener clip adequate yield strength, which in turn prevents the clip from incurring permanent structural deformation caused by the use of excessive force during assembly and disassembly.

Figure 13:
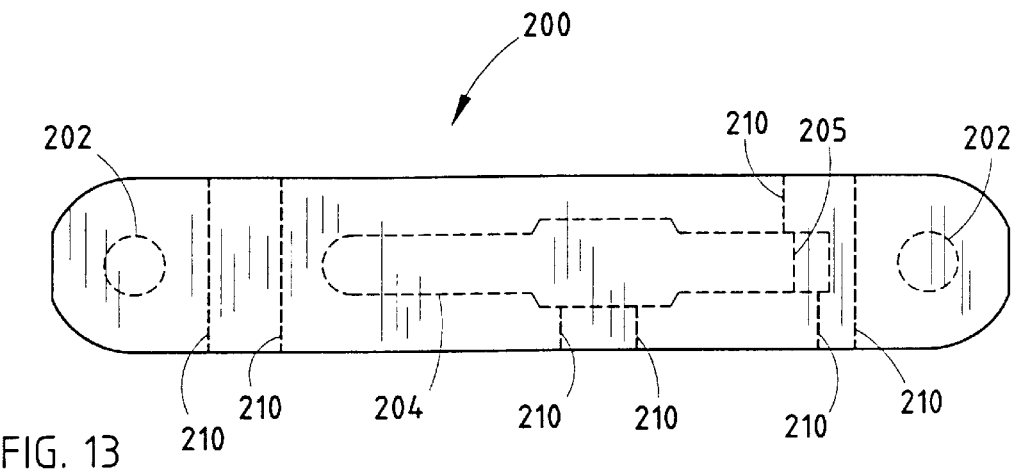
FIG. 13 is a top plan view of a flat metal blank after cutting or stamping and prior to bending into the fastener clip depicted in FIGS. 1 through 5.

Turning now to FIG. 13, the manufacture of fastener clip 10 is preferably made from a sheet or blank of 200 of spring steel. Blank 200 includes stamped or punched circular cut lines 202 and tab cut line 204 having a transverse cut line 205. Once stamped or punched using normal industry procedure, blank 200 is cut along cut lines 202, 204 and 205 to form throughholes 36 and slot 50. Blank 200 is then bent at substantially right angles by standard metal bending techniques along transverse bend lines 210 to form upstanding legs 22, 24 and 27, arms 40, 42, access member 60 and flap 80.

Figure 14:
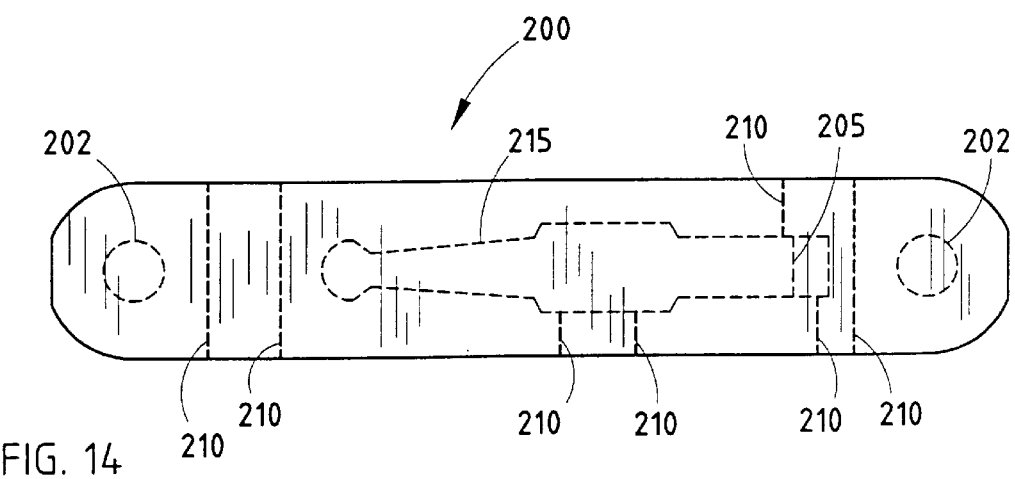
FIG. 14 is a top plan view of a flat metal blank after cutting or stamping and prior to bending into the fastener clip depicted in FIGS. 6 and 7.

Turning now to FIG. 14, the manufacture of fastener clip 10a involves the same steps as described above, with the exception that a slot cut line 215 is tapered to a minimum width to form a throat in the resulting slot, and abruptly widens, enabling the formation of tapered slot 94 and seating area 95.

Figure 15:
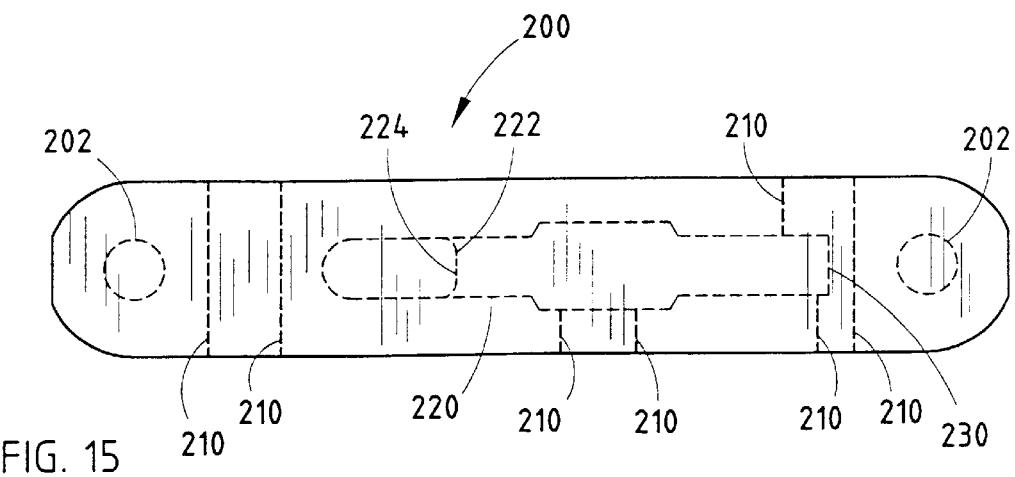
FIG. 15 is a top plan view of a flat metal blank after cutting or stamping and prior to bending into the fastener clip depicted in FIGS. 8 through 12.

Turning now to FIG. 15, the method of making fastener clip 10b includes the formation of circular cutout lines 202 and slot cut line 220. End 222 is formed with a cutout line 224 which is slightly curved at its ends to enable the formation of appendages 164'. Once cut, blank 200 is bent at substantially right angles along bend lines 210 to form legs 22, 24 and 27, arms 40, 42 and access member 60. Thereafter, locking flange 160 is formed by bending upward along bend line 230.

The above description is considered that of the preferred embodiments only. Modifications of the invention will occur to those skilled in the art and those who make or use the invention. Therefore, it is understood that the embodiments shown in the drawings and described above are merely for illustrative purposes and are not intended to limit the scope of the invention, which is defined by the following claims as interpreted according to the principles of patent law, including the doctrine of equivalents.

The embodiments of the invention in which an exclusive property or privilege is claimed are defined as follows:

1. A fastener clip comprising:
   a pair of flanges;
   a first leg extending from one flange of said pair of flanges;
   a second leg extending from the other flange of said pair of flanges;
   a central member attached to said first and said second legs and positioned in a plane spaced from the plane of at least one of said pair of flanges, said central member formed with a slot therethrough, said slot dimensioned to receive a securing stud; and
   an access member attached to said central member and said second leg, said access member dimensioned to enable the securing stud to pass therethrough and engage said slot from a lateral direction substantially perpendicular to the longitudinal axis of said slot.

2. The fastener clip as recited in claim 1, wherein said central member further comprises a first arm attached to said first leg and said second leg and a second arm attached to said first leg and said access member, said first arm and said second arm defining said slot therebetween.

3. The fastener clip as recited in claim 2, wherein said slot has an open end and a closed end, and wherein said first arm and said second arm include portions which are inclined toward said open end such that said closed end of said slot is positioned in a plane below the plane of said open end.

4. The fastener clip as recited in claim 2, wherein said first arm is formed having a region of reduced width, said region of reduced width opposing said access member, said region of reduced width enabling the head of the securing stud to clear said access member.

5. The fastener clip as recited in claim 1, where said access member is L-shaped.

6. The fastener clip as recited in claim 2, wherein said access member further comprises:
   a first member depending from said second arm, said first member having an end; and
   a second member attached to said end of said first member and said second leg.

7. The fastener clip as recited in claim 6, wherein said first member is substantially perpendicular to said first arm and said second arm.

8. The fastener clip as recited in claim 6, wherein said second member is substantially parallel to said first arm and said second arm.

9. A fastener clip comprising:
   a pair of flanges;
   a first leg extending from one flange of said pair of flanges;
   a second leg extending from the other flange of said pair of flanges;
   a central member attached to said first and said second legs and positioned in a plane spaced from the plane of at least one of said pair of flanges, said central member formed with a slot therethrough, said slot dimensioned to receive a securing stud;
   an access member attached to said central member and said second leg, said access member dimensioned to enable the securing stud to pass therethrough and engage said slot formed in said central member; and wherein said central member has a first arm attached to said first leg and said second leg and a second arm attached to said first leg and said access member, said first arm and said second arm defining said slot therebetween, wherein said access member includes a first member depending from said second arm, said first member having an end, and a second member attached to said end of said first member and said second leg, and wherein said second member is positioned in a plane between the plane defined by said central member and the plane defined by said pair of flanges.

10. The fastener clip as recited in claim 1, wherein said pair of flanges extend in opposite directions.

11. The fastener clip as recited in claim 1, wherein said fastener clip is formed in one piece from spring steel.

12. The fastener clip as recited in claim 2, wherein said slot has a closed end proximate to said first leg, and wherein the width of said slot gradually decreases toward said closed end of said slot.

13. The fastener clip as recited in claim 2, wherein said slot has a seating end proximate to said first leg, and wherein the width of said slot gradually decreases toward said seating end to a minimum width, said minimum width being less than the width of said seating end.

14. The fastener clip as recited in claim 1, wherein said slot has a closed end proximate to said first leg and wherein said fastener clip further comprises a locking flange extending upwardly from said second leg toward said central member, said locking flange terminating short of and below said closed end of said slot, wherein the head of the securing stud depresses said locking flange as the securing stud travels toward said closed end of said slot, said locking flange preventing removal of the securing stud from said closed end of said slot.

15. The fastener clip as recited in claim 14, wherein said locking flange has an end formed with a pair of appendages.

16. A fastener clip comprising:
    a base;
    a first leg extending from said base;
    a second leg extending from said base, said second leg spaced apart from said first leg;
    a third leg extending from said base;
    a first arm attached to said first leg and said second leg;
    a second arm attached to said first leg, said first arm and said second arm positioned in a plane spaced from the plane of said base, said first arm and said second arm defining a slot therebetween, said slot having an axis extending therealong and a closed end proximate to said first leg, said slot dimensioned to receive a securing stud for movement generally parallel to said axis;
    an access member attached to said second arm and said third leg, said access member positioned out of alignment with said axis of said slot and dimensioned to enable the securing stud to pass therethrough and engage said slot; and
    an upstanding flap positioned between said second leg and said third leg, said flap prohibiting movement of the securing stud beyond said second leg and said third leg when the stud is received in said slot.

17. The fastener clip as recited in claim 16, wherein said slot has an open end, and wherein said first arm and said second arm include portions which are inclined toward said open end such that said closed end of said slot is positioned in a plane below the plane of said open end.

18. The fastener clip as recited in claim 17, wherein said first arm is formed having a region of reduced width, said region of reduced width opposing said access member, said region of reduced width enabling the head of the securing stud to clear said access member.

19. The fastener clip as recited in claim 18, wherein said access member further comprises:
    a first member depending from said second arm, said first member having an end; and
    a second member attached to said end of said first member and said third leg.

20. The fastener clip as recited in claim 19, wherein the width of said first member is less than the width of said second member.

21. The fastener clip as recited in claim 20, wherein said second member is formed having a region of reduced width.

22. The fastener clip as recited in claim 19, wherein said first member is substantially perpendicular to said first arm and said second arm.

23. The fastener clip as recited in claim 22, wherein said second member is substantially parallel to said first arm and said second arm.

24. A fastener clip comprising:
    a base:
    a first leg extending from said base;
    a second leg extending from said base, said second leg spaced apart from said first leg;
    a third leg extending from said base;
    a first arm attached to said first leg and said second leg, wherein said first arm is formed having a region of reduced width;
    a second arm attached to said first leg, said first arm and said second arm positioned in a plane spaced from the plane of said base, said first arm and said second arm defining a slot therebetween, said slot having a closed end proximate to said first leg, said slot dimensioned to receive a securing stud, wherein said slot has an open end, and wherein said first arm and said second arm include portions which are inclined toward said open end such that said closed end of said slot is positioned in a plane below the plane of said open end;
    an access member attached to said second arm and said third leg, said access member dimensioned to enable the securing stud to pass therethrough and engage said slot, said region of reduced width opposing said access member, said region of reduced width enabling the head of the securing stud to clear said access member, wherein said access member includes a first member depending from said second arm, said first member having an end, and a second member attached to said end of said first member and said third leg, wherein said second member is positioned in a plane between the plane defined by said central member and the plane defined by said base; and
    a flap positioned between said second leg and said third leg, said flap prohibiting movement of the securing stud beyond said second leg and said third leg.

25. The fastener clip as recited in claim 17, wherein said base further comprises:
    a first flange attached to said first leg; and
    a second flange attached to said second leg and said third leg.

26. The fastener clip as recited in claim 25, wherein said first flange and said second flange extend in opposite directions.

27. The fastener clip as recited in claim 17, wherein said fastener clip is formed in one piece from spring steel or a material with similar properties.

28. The fastener clip as recited in claim 17, wherein the width of said first arm and said second arm gradually increase toward said closed end of said slot.

29. The fastener clip as recited in claim 17, wherein said slot has a seating end proximate to said first leg, and wherein the width of said slot gradually decreases toward said seating end to a minimum width, said minimum width of said slot being less than the width of said seating end.

30. A fastener clip comprising:

a pair of flanges;

a first leg extending from one flange of said pair of flanges;

a second leg extending from the other flange of said pair of flanges;

a central member attached to said first and said second legs and positioned in a plane spaced from the plane of at least one of said pair of flanges, said central member formed with a slot therethrough, said slot dimensioned to receive a securing stud; and an access member attached to said central member and said second leg, said access member dimensioned to enable the securing stud to pass therethrough and engage said slot formed in said central member, wherein said access member includes a first member depending from said central member, said first member having an end, and a second member attached to said end of said first member and said second leg, and wherein said second member is positioned in a plane between the plane defined by said central member and the plane defined by said pair of flanges.

31. A fastener clip comprising:

a base;

a first leg extending from said base;

a second leg extending from said base, said second leg spaced apart from said first leg;

a third leg extending from said base;

a first arm attached to said first leg and said second leg;

a second arm attached to said first leg, said first arm and said second arm positioned in a plane spaced from the plane of said base, said first arm and said second arm defining a slot therebetween, said slot having an axis extending therealong and a closed end proximate to said first leg, said slot dimensioned to receive a securing stud for movement generally parallel to said axis; and an access member attached to said second arm and said third leg, said access member opposing said first arm and positioned out of alignment with said axis of said slot, said access member dimensioned to enable the securing stud to pass therethrough and engage said slot.

* * * * *

UNITED STATES PATENT AND TRADEMARK OFFICE
CERTIFICATE OF CORRECTION

PATENT NO.   : 6,109,819
DATED        : August 29, 2000
INVENTOR(S)  : Montgomery J. Welch It is certified that error appears in the above-identified patent and that said Letters Patent is hereby corrected as shown below:

<u>Column 4,</u>
Line 55, insert -- , -- after "4,473,316"

<u>Column 5,</u>
Line 2, insert -- to -- after "52"

Signed and Sealed this

Fifteenth Day of October, 2002

Attest:

JAMES E. ROGAN
Attesting Officer         Director of the United States Patent and Trademark Office